United States Patent [19]

Vertenstein

[11] 4,052,304

[45] Oct. 4, 1977

[54] PREHEATING DEVICE FOR CENTRIFUGAL

[75] Inventor: Mathieu J. Vertenstein, Denver, Colo.

[73] Assignee: CF&I Engineers, Inc., Denver, Colo.

[21] Appl. No.: 707,154

[22] Filed: July 21, 1976

[51] Int. Cl.$^2$ .......................... B04B 3/00; B01D 33/02

[52] U.S. Cl. ........................................ 210/78; 127/19; 127/56; 210/179; 210/181; 210/360 R; 233/11

[58] Field of Search .................... 210/360 R, 175, 179, 210/181, 78, 380 R; 233/11; 127/19, 56

[56] References Cited

U.S. PATENT DOCUMENTS

| | | | |
|---|---|---|---|
| 214,267 | 4/1879 | Walker et al. | 210/360 R |
| 3,837,913 | 9/1974 | Hillebrand et al. | 127/19 |

*Primary Examiner*—William A. Cuchlinski, Jr.

*Attorney, Agent, or Firm*—George S. Schwind; Edward H. Mazer

[57] ABSTRACT

An air and massecuite warming device comprising a pair of nested, concentric frusto-conical tubular members positioned above a massecuite separating centrifuge in which steam is directed into the chamber formed between the nested members. The steam is discharged from the inner member by a plurality of nozzles located in the conical wall of the inner member forming a vortex. Before contacting the massecuite, the steam mixes with the air drawn through the centrifuge, raising the air temperature. This warm air reduces the massecuite viscosity by increasing the temperature of the massecuite and the temperature of the centrifuge elements contacting the massecuite thereby increasing the centrifuge separation capacity and improving the purity of the sugar produced.

17 Claims, 5 Drawing Figures

PREHEATING DEVICE FOR CENTRIFUGAL

BACKGROUND AND SUMMARY OF THE INVENTION

This invention relates to a device and method for warming inlet air for a massecuite separating centrifuge. In currently available separating systems, the centrifuge capacity and the purity of the separated sugar are limited by the high viscosity of the massecuite processed. In the normal massecuite separation temperature range of 45°-55° C, the viscosity of the massecuite varies greatly with temperature. It is advantageous to process the massecuite at the highest possible temperature, since the throughput per square inch of screen at constant G-factor is higher when the massecuite viscosity is low. In addition, processing at lower viscosities results in faster, more complete drainage of the liquid. This enables dryer, less colored sugar crystals to be obtained. However, the massecuite inlet temperature must be kept below the temperature at which the sugar crystals begin to melt. When massecuite has been heated below this melting temperature and the feed directed into a conventional centrifugation system, it has been found that the massecuite is cooled substantially below the desired separation temperature by the cold air drawn into the centrifuge basket.

In prior art systems, hot air blowers or electric heaters have been employed in the centrifugal inlet to warm the ambient air to the centrifuge. However, the operating costs of these units tend to be high. Other systems designed for raising air and massecuite temperature have involved spraying steam directly onto the massecuite or installing complex heating devices. Directing steam onto the outer periphery of massecuite supply as it enters the centrifugal is not desirable, since steam may melt the outer sugar crystals in the massecuite, while not heating the inner massecuite sufficiently. The complex heating devices employed usually have proven expensive to manufacture, operate and clean. Moreover, some of the devices restrict the opening into the centrifuge, thereby raising the possibility of pluggage at the centrifuge inlet if the inlet massecuite stream contacts and adheres to the heating devices. This would cause back-ups in the massecuite supply system and also result in interruptions in the flow of massecuite to the centrifuge basket.

An object of this invention is to provide a device and system for warming the air surrounding the inlet massecuite, to thereby maintain the massecuite at temperatures more favorable for separation without melting the outer exposed sugar crystals.

A further object is to provide an air warming member with a relatively non-restricted opening above the centrifuge in which the inner surface is heated to prevent or minimize the effect of massecuite sticking to the member surface.

Another object is to provide a system for continuously warming the elements of a rotating massecuite separating centrifuge which contact the massecuite, to thereby add additional heat to the massecuite.

In the present invention, the aforementioned objects are accomplished by the utilization above the centrifuge basket of a plurality of tubular members which form a chamber having a plurality of inwardly directed nozzles communicating with a source of steam, or similar heat transfer fluid, which discharge in a vortex type flow the heated fluid around massecuite passing through the members into the centrifuge. In the preferred embodiment, steam is directed into a chamber formed between a pair of nested, concentric, frusto-conical members. The steam is then discharged through a plurality of uniformly distributed, inwardly directed nozzles in the conical wall of the inner member. The nozzles are directed substantially tangentially and slightly downwardly creating a vortex of steam and air around the inlet massecuite stream to prevent excessive cooling of the massecuite during subsequent processing, without substantial quantities of the steam directly contacting the massecuite and possibly scorching or melting the sugar crystals therein. This mixture of steam and warmed air is then drawn into the centrifuge basket, where it continues to warm the massecuite while also heating the centrifuge basket screen and accelerator bell. These centrifuge elements, in turn, transmit a portion of this heat to the massecuite on contact. With this design, the opening into the centrifuge basket is not significantly restricted by the nozzles, resulting in little, if any, massecuite contacting the inner member surface. Since steam flow in the chamber formed between the members heats the surface of the inner member, any massecuite accidentally sticking to this surface is quickly melted and slides into the centrifuge basket.

DESCRIPTION OF THE PREFERRED EMBODIMENT

Figure 1:
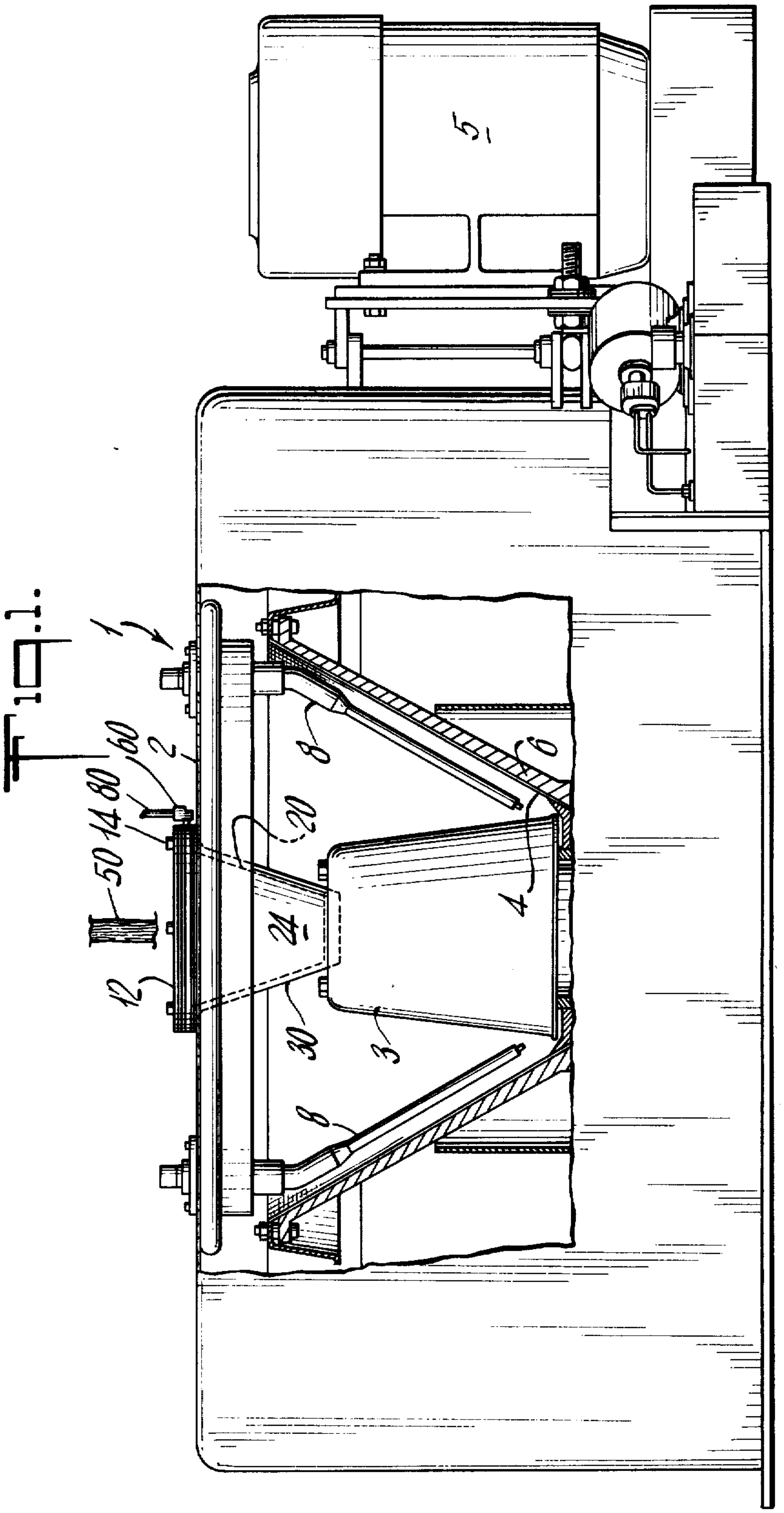
FIG. 1 is a partial sectional view of an air warming device of this invention mounted on a rotating basket centrifuge.

Referring to FIG. 1, a rotating basket centrifuge, generally indicated by reference numeral 1 is shown having inner and outer nested, conical tubular members 20, 30, respectively, mounted on housing cover 2. A suspension, such as massecuite 50, passing through inner member 20 is directed by accelerator bell 3 downwardly and outwardly onto screen 4 affixed to basket 6 which is rotated at high speed by drive system 5. The sugar crystals in the massecuite are directed upwardly on screen 4 while the liquid is forced through the screen. Wash spray lances 8 are provided for assisting in the separation of the molasses from the sugar crystals in the centrifuge.

Figure 2:
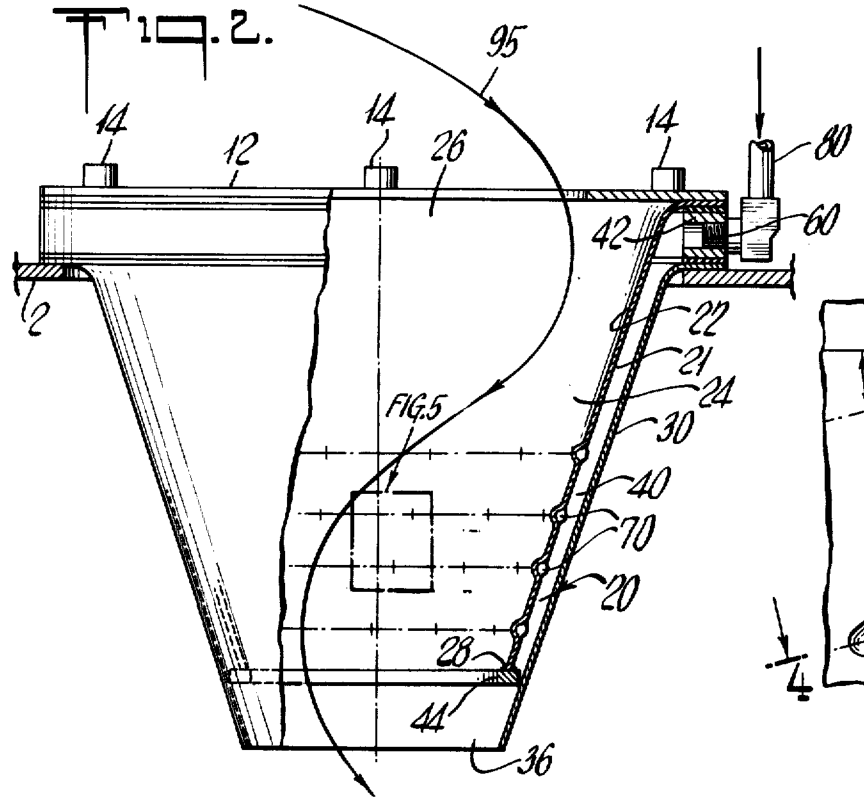
FIG. 2 is an enlarged partial sectional view of the air warming device of FIG. 1.

FIG. 2 shows spaced apart first, inner; and second, outer conical tubular members; 20, 30 respectively and closed chamber 40 formed therebetween. The upper portion of the chamber is closed by inserting a spacer 42 between said inner and outer members. The lower portion of the chamber is closed by flange 44 located between the inner and outer members. In the embodiment shown, flange 44 has been welded to the base 28 of member 20. Inner member 20 is shown having frustro-conical wall 21, upper circular opening 26, lower circular opening 36 and passage 24 between said upper and lower openings. Upper opening 26 is reduced in diameter by vessel cover 12 secured by bolts 14. Steam inlet fitting 60 passes through spacer 42 to connect chamber 40 to a steam source, such as steam line 80. Nozzles 70, uniformly located in wall 21, direct steam from closed chamber 40 around the surface. Air, shown generally by line 95, is drawn into member 20 by the suction created through rotation of basket 6 in the well known manner.

Figure 3:
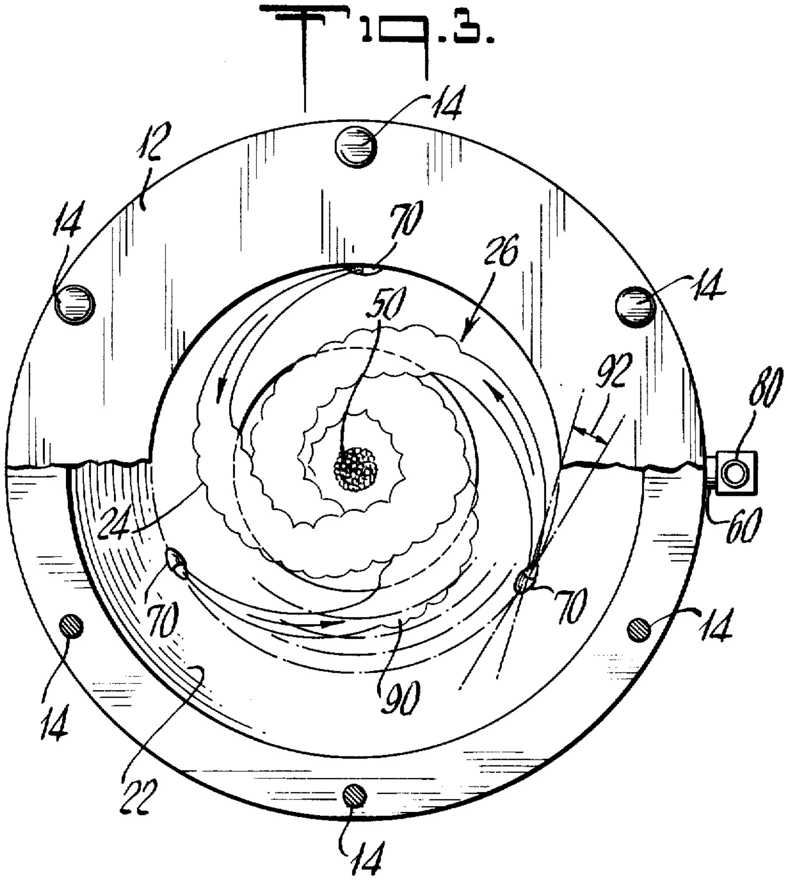
FIG. 3 is a plan view of the air warming device of FIG. 2.
Figure 4:
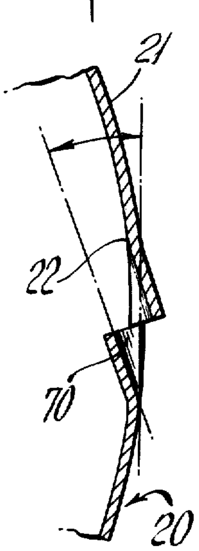
FIG. 4 is a view of section 4—4 in FIG. 5.
Figure 5:
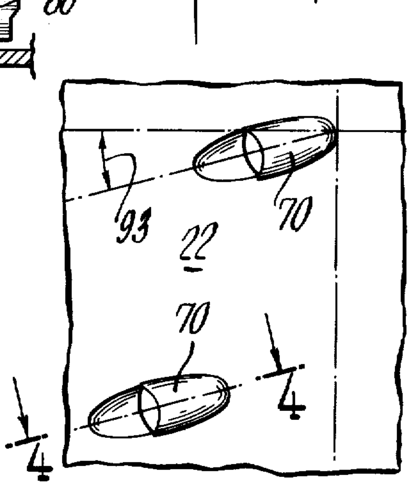
FIG. 5 is an enlarged view of the area indicated in FIG. 2.

Referring to FIGS. 3, 4, and 5, nozzles 70 are shown at a slight inward and downward angle. It has been found that an angle 92 with respect to a horizontal tangent to the inner surface of approximately 15°-20° is usually satisfactory for creating a vortex of steam 90 which effectively mixes the steam with air drawn into member 20 by the rotation of basket 6 and minimizes the amount of steam directly contacting massecuite 50. The nozzles also should have a slight downward angle to prevent the steam from escaping upwardly out of member 20. It has been found that a downward angle 93 of approximately 10°-15° from the horizontal is satisfactory for this. In the embodiment shown, nozzles 70 comprise punch-formed perforations in wall 21 of member 20. This type perforation results when the wall is pierced at the desired locations and angles, and none of the projecting pierced material is removed, note FIG. 4. However, other types of nozzles, such as commercially available nozzles having a narrow spray cone or pierced or drilled nozzles in which the pierced or drilled material is removed also would be satisfactory. The nozzle diameters should be sized so that good mixing of the steam with air occurs and substantial amounts of steam do not contact the massecuite directly in member 20.

Steam 90 enters chamber 40 through steam inlet fitting 60 and flows downwardly and around wall 21. The steam is discharged into member 20 through nozzles 70. The nozzles direct the steam substantially tangentially and slightly downwardly around the inner surface 22 of wall 21 of member 20 creating a vortex to draw in and mix outside air with the steam, resulting in steam and warmed air entering centrifuge 1, where the steam and warmed air heat massecuite 50 as well as the accelerator bell 3, screen 4, and basket 6 as shown in FIG. 1. The bell, screen and basket, in turn, heat the massecuite on contact. In field tests utilizing member 20, 8.5 inches high, with a 4.5 inch diameter lower opening 36 and a 10 inch upper opening 26 and having 16 1/8-inch diameter nozzles 70 directed at the aforementioned angles, the temperature of the liquid phase (molasses) of massecuite 50 passing through basket 6 of a normally loaded centrifuge was found to be 7.6° C higher when 18 psig steam was passed through intermediate area 40 and into member 20, than when no steam was used. In this application, the use of steam reduced the massecuite viscosity about 25% and would enable a theoretical increase in the average centrifugal throughput capacity of approximately 40%, clearly indicating the value and importance of this invention.

The invention as described and illustrated is believed to admit of many modifications and variations within the ability of persons skilled in the art, all such modifications and variations being deemed to be included in the spirit and scope of the appended claims.

I claim:

1. An inlet air and suspension warming device in proximity to the inlet of a rotating basket separating centrifuge for accepting the downward passage through said device of a suspension to be separated, comprising:

a. a first tubular member, said member adapted to pass a suspension to be separated therethrough;

b. a second substantially frustro-conical, tubular member in surrounding nested relationship to said first member;

c. means to seal the ends of the respective members to form a closed chamber therebetween;

d. steam supply means communicating with said chamber; and, e. a plurality of steam spray nozzles in said first member, said nozzles being inwardly directed at an angle to the suspension to be separated whereby a vortex is created within said first member by steam passing through said nozzles to thereby minimize the impinging of the steam on the suspension flowing through said first member while warming the inlet air.

2. The device of claim 1 wherein the suspension is massecuite.

3. The device of claim 2 where said first tubular member is substantially frusto-conical.

4. The device of claim 3 wherein the angle of said nozzles from a horizontal tangent to said first tubular member is approximately 15°-20°.

5. The device of claim 4 wherein said nozzles are downwardly directed with respect to the horizontal at an angle of approximately 10°-15°.

6. The device of claim 5 wherein said nozzles comprise punch-formed perforations in the wall of said first member.

7. The device of claim 6 wherein the means to seal the respective members in spaced apart relationship to form a closed chamber includes a spacer to seal the upper ends of said members, and a flange affixed to the lower end of at least one said members to seal the lower ends of said members.

8. An air and suspension warming device for location above the basket of a rotating basket centrifuge for the downward flow through said device of massecuite, said device comprising:

a. a first tubular member having an upper opening communicating with the air and a lower opening communicating with the centrifuge inlet;

b. a steam source connected to said first tubular member;

c. a plurality of nozzles in the wall of said first member communicating with said steam source, said nozzles being inwardly directed at an angle of approximately 15°-20° from a horizontal tangent to said tubular member, whereby the steam discharged from said nozzles mixes with the air without substantial quantities of said steam directly impinging on the massecuite flowing from the upper opening to the lower opening.

9. The device of claim 8 including:

a. a second tubular member in surrounding nested relationship to said first member;

b. means to seal the ends of the respective members to form a closed chamber therebetween.

10. The device of claim 9 wherein said first member is substantially frusto-conical.

11. The device of claim 10 wherein said second member is substantially frusto-conical.

12. The device of claim 11 wherein the angle of said nozzles from a horizontal tangent to said first member is approximately 15°-20°, whereby a vortex is created by steam passing through said nozzles.

13. The device of claim 12 wherein said nozzles are downwardly directed with respect to the horizontal at an angle of approximately 10°-15°.

14. The device of claim 13 wherein said nozzles comprise punch-formed perforations in the wall of said first member.

15. A method for reducing the viscosity of heat sensitive suspensions to be separated in a continuous rotating basket centrifuge comprising the steps of:

a. Passing the suspension downwardly through a first tubular member;

b. Introducing steam into the member through nozzles on the wall of the first tubular member, the angle between the nozzles and a horizontal tangent to the first tubular member ranging between approximately 15°–20° to thereby form a vortex with the air in the member such that the steam does not directly impinge on the suspension.

16. The method of claim 15 including the step of passing the steam through at least a portion of the closed chamber formed between the surface of said first tubular member and an outer, nested member.

17. The method of claim 16 wherein the heat sensitive suspension is massecuite.

* * * * *